(12) United States Patent
Reischmann et al.

(10) Patent No.: US 10,349,776 B2
(45) Date of Patent: Jul. 16, 2019

(54) ELECTRONIC TEMPERATURE CONTROL SYSTEM FOR A GRILL

(71) Applicants: Michael Reischmann, Eustis, FL (US); Phillip Williams, Clinton, CT (US)

(72) Inventors: Michael Reischmann, Eustis, FL (US); Phillip Williams, Clinton, CT (US)

(73) Assignee: Kenyon International, Inc., Clinton, CT (US)

( * ) Notice: Subject to any disclaimer, the term of this patent is extended or adjusted under 35 U.S.C. 154(b) by 0 days.

(21) Appl. No.: 15/462,400

(22) Filed: Mar. 17, 2017

(65) Prior Publication Data

US 2018/0116452 A1    May 3, 2018

Related U.S. Application Data

(60) Provisional application No. 62/415,063, filed on Oct. 31, 2016.

(51) Int. Cl.
*A47J 37/07*    (2006.01)

(52) U.S. Cl.
CPC ....... *A47J 37/0704* (2013.01); *A47J 37/0786* (2013.01)

(58) Field of Classification Search
CPC ........................ A47J 37/0713; A47J 37/0786
USPC .......... 99/331, 340, 450.1, 466.1; 126/25 R, 126/39 E, 39 N; 219/445, 1, 450.1
See application file for complete search history.

(56) References Cited

U.S. PATENT DOCUMENTS

| 4,502,461 | A | * | 3/1985 | Keating | F24C 15/105 126/374.1 |
|---|---|---|---|---|---|
| 4,899,724 | A | * | 2/1990 | Kuechler | A47J 37/0682 126/39 BA |
| 6,252,204 | B1 | * | 6/2001 | Po-Hei | A47J 37/0676 219/450.1 |
| 2005/0205544 | A1 | * | 9/2005 | Bachinski | A47J 37/0709 219/386 |
| 2010/0132692 | A1 | * | 6/2010 | Shaffer | A47J 37/0713 126/39 E |

FOREIGN PATENT DOCUMENTS

| JP | 07275132 A | * | 10/1995 |
|---|---|---|---|
| JP | 2002085264 | * | 3/2002 |

* cited by examiner

*Primary Examiner* — Thien S Tran
(74) *Attorney, Agent, or Firm* — St. Onge Steward Johnston & Reens, LLC

(57) ABSTRACT

A grill having a control system that monitors the temperature of the grill grate and adjusts heat output to the grill according to a temperature selected by the user. The grill grate includes channels on the rear face thereof, one channel contains the electrically powered heat source and the other channel contains the temperature sensor. A drip pan is located below the grill grate. The grill grate is removable from the grill and removable from the two channels for cleaning. Multiple zones are provided, each with a controller that allows the user to set the desired temperature of the grill grate/grilling surface.

26 Claims, 4 Drawing Sheets

ELECTRONIC TEMPERATURE CONTROL SYSTEM FOR A GRILL

FIELD OF THE INVENTION

The following relates to a temperature measurement and control system for an electric grill. More particularly, the following relates to a grill surface temperature controller which allows the user to set their desired grill surface temperature.

BACKGROUND OF THE INVENTION

Gas and electric grills are often provided with control knobs that allow the user to choose between high and low settings in terms of power or heat. The resulting temperature of the grill surface although impacted by the knob settings is not readily predictable because environmental conditions will impact various heat transfer rates. For example, if the outside temperature is 50 degrees or 90 degrees, the rate of heat loss by the grill will change. In addition, if the grill lid is open or shut, the knob settings will need to be adjusted to maintain the same grill surface temperature.

However, the actual temperature of the grilling surface is not what usually drives the control settings. Rather, the grill lid will oftentimes have a temperature gauge to measure the air temperature inside the grill. Although it may be useful in certain scenarios to know the air temperature inside the grill, it is nearly impossible for the user to reliably predict the temperature of the grilling surface. In addition, the readings of the air temperature gauge are not used to control the knobs using automatic controllers. Rather, the user must set the knobs and wait to see where the air temperature lands, rather than being able to set the desired temperature and have a controller which adjusts the power/gas output.

SUMMARY OF THE INVENTION

Therefore, it is an object of the present invention to provide a temperature controller for a grill which holds the grill surface at a temperature set by the user.

It is further desirable to enable reading of the temperature of the surface while allowing the surface to easily be removed for cleaning.

These and other objects are achieved by providing a grill including a selector and a controller coupled to the selector such that an input received from the selector is indicative of a desired temperature. A heat source is coupled to the controller and the controller is configured to adjust heat output from the heat source. A cooking element has a cooking surface and a temperature sensor is in contact with the cooking element. The cooking element is removable with respect to the temperature sensor. The controller receives a temperature reading from said temperature sensor and adjusts the heat output of the heat source to maintain the cooking element at the desired temperature.

In one aspect the temperature sensor is a resistance thermal detector (RTD) embedded in a housing, the housing directly in contact with said cooking surface. In other aspects the heat source is electrical. In other aspects the selector is configured to receive a second input indicative of a desired cooking time and when the desired cooking time expires, the heat source is turned off.

In other aspects, the cooking element includes a channel sized to receive said temperature sensor therein. In yet other aspects the temperature sensor includes a housing which contacts a channel of the cooking element sized to receive the temperature sensor therein. In one aspect the cooking element is a grill grate. In yet another aspect the cooking element is a griddle. In still other aspects the cooking element is removable from both the temperature sensor and the heat source.

In another aspect a grill is provided and includes a selector and a controller coupled to the selector such that an input received from the selector is indicative of a selected temperature. A heat source is coupled to the controller and the controller is configured to adjust a heat output from the heat source. A cooking element has a cooking surface with holes therein to allow matter to pass there through during cooking. A temperature sensor is in contact with the cooking element and the cooking element is removable with respect to the temperature sensor. The controller receives a temperature reading from the temperature sensor and adjusts the heat output of the heat source to maintain the cooking element at approximately the selected temperature.

In some aspects a first channel is positioned on a rear face of the cooking element, opposite the cooking surface. The first channel includes a first set of at least two first sidewalls such that the heat source is configured to fit within and is removable from the first channel. In other aspects a second channel extends from an outer face of one of the first set of two sidewalls towards an edge of the cooking element. In other aspects, the grill includes a second set two sidewalls defining the second channel and extending from one of the two first sidewalls towards an edge of the cooking element. The second set of two sidewalls contacts and extends directly the one of the first set of two sidewalls. In other aspects the first channel includes two substantially straight sections joined by a curved section, with the second channel located adjacent to the curved section.

In some aspects the temperature sensor is a resistance thermal detector (RTD) embedded in a housing, the housing directly in contact with the cooking element. In some aspects, the heat source is an electrically powered heating element. In other aspects, the selector is configured to receive a second input indicative of a desired cooking time such that when the desired cooking time expires, the heat source is turned off. In some aspects, the cooking element includes a channel sized to receive the temperature sensor therein. In other aspects a temperature sensor includes a housing which contacts the channel of the cooking element. In other aspects the cooking element is a grill grate and a drip pan is located below the cooking element. In one aspect, the cooking element is removable from both the temperature sensor and the heat source. In other aspects, the selector includes a display which is configured to display the selected temperature. In yet other aspects, the controller is configured to adjust a heat output when a reduction in temperature of the cooking element is detected.

In yet other aspects, a grill grate is provided, the grill grate being metallic and having a rectilinear body with a length and a width. A cooking surface is located on a first face of the rectilinear body. A first channel is positioned on a rear face of the rectilinear body, the channel including at least two substantially straight sections connected by a curved section. A second channel is positioned on the rear face, the second channel extends from an edge of the rectilinear body and towards the first channel. The second channel terminates at a wall which separates the first and second channels, the wall being positioned adjacent to the curved section. In some aspects, the first channel is defined by a first set two sidewalls. In some aspects, the second channel is defined by a second set of two sidewalls which extend from one of the sidewalls of the first set two sidewalls.

In other aspects a method of controlling a grill surface temperature is provided and includes the steps of: providing a grill having a cooking element and a heat source configured to heat the cooking element; providing a controller configured to control a heat output of the heat source based on a selected temperature received at a selector; controlling the heat output of the heat source via the controller based on the selected temperature and a temperature reading, the temperature reading from a temperature sensor in communication with the controller wherein the temperature sensor is directly in contact with the cooking element.

In some aspects, the temperature sensor is positioned within a channel on a rear face of the cooking element and the cooking element is removable from the temperature sensor. In some aspects the cooking element has holes therein and a part of the cooking element aligning with the channel is configured without holes. In other aspects the heat source is positioned between two walls extending from the cooking element, with a second part of the cooking element between the two walls configured without holes therein such that matter passing through the plurality of holes does not contact the heat source. In other aspects the temperature sensor includes a housing directly in contact with the cooking element.

Other objects and features will become apparent from considering the below description and the attached drawings.

DETAILED DESCRIPTION OF THE INVENTION

Figure 1:
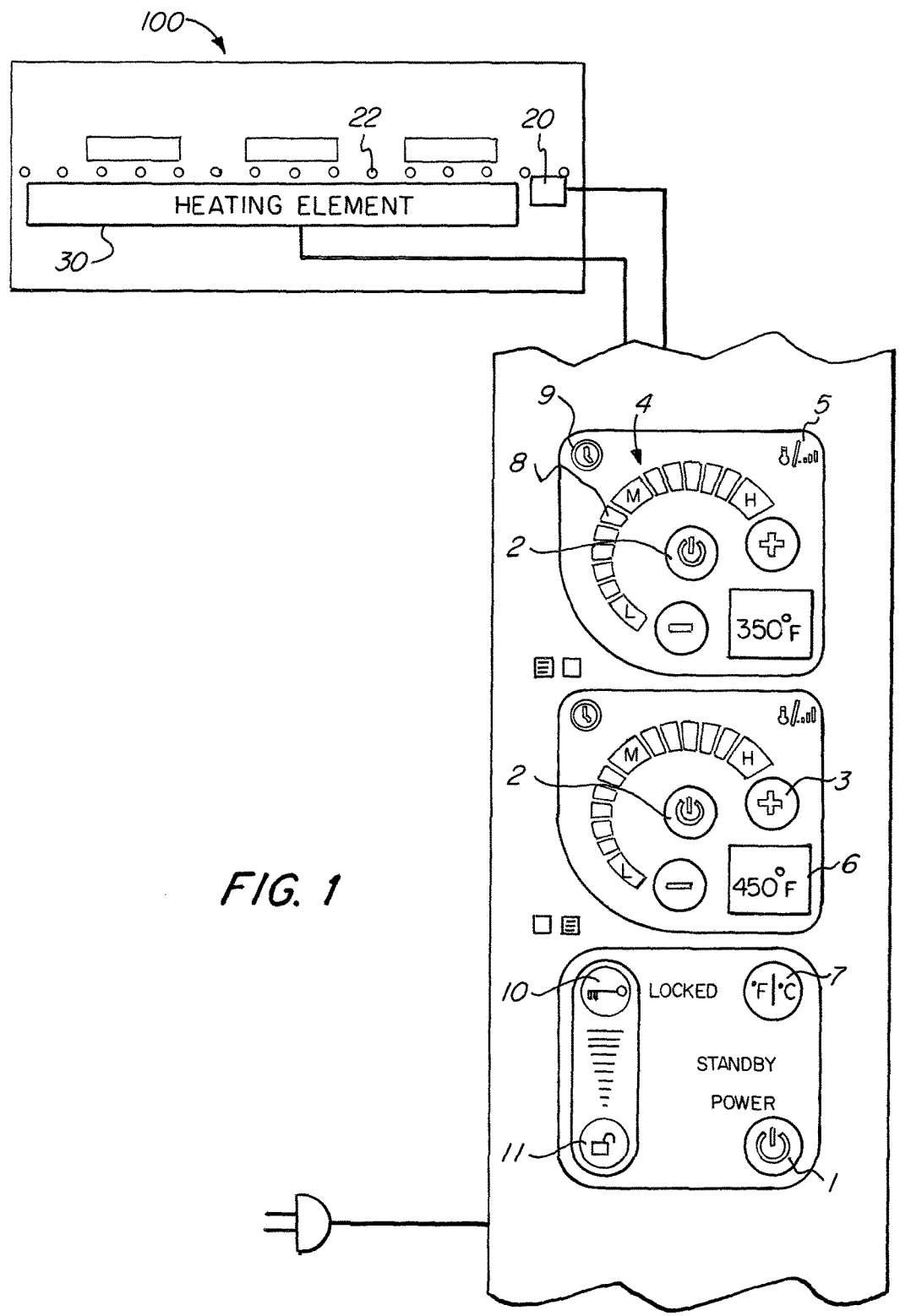
FIG. 1 is a diagram of the grill and controller according to one embodiment of the present invention.

Referring now to the drawings, wherein like reference numerals designate corresponding structure throughout the views. The following examples are presented to further illustrate and explain the present invention and should not be taken as limiting in any regard.

Disclosed herein is a touch control grill that allows the user to program the temperature of the grilling surface. Using the disclosed software with a custom algorithm the grill gives the user the ability to select the temperature desired to grill whatever type of foods they desire. For example, 350° F. for chicken, 400° F. for fish, 500° F. for steak To actuate the grill control, the user touches the master power icon 1 on the glass panel for 250 milliseconds (as an example). The user then selects the grilling zone they desire to use and then touch the power icon to activate the appropriate zone 2. The user now has the ability to set the power level (1-16) or the temperature of the grilling surface (150° F.-550° F.). The power levels and temperature ranges are exemplary as would be understood by one of skill in the art and levels and ranges outside these values are contemplated, depending on the particular parameters required.

To set the power level the user touches the + icon 3 on the glass panel for the appropriate grilling zone. Holding the finger on the + icon will cause the power level to increase until it reaches the maximum power level of 16. Another method of increasing the power level is to place a finger on the graduated arc 4 from LO and sweep it along the path of the arc stopping at the level desired.

To set the temperature of the grilling surface the user touches the ᵗ/ₘ icon 5 and the display changes from power to temperature with 150° flashing in the display window 6. The user now increases the temperature desired by touching the + icon 3 or by running their finger around the graduated arc 4. The temperature selected will continue to flash 6 until the grilling zone has reached the selected temperature. The user has the ability to switch from ° F. to ° C. by touching the ° F./° C. icon 7.

Around the outside of the graduated arc are 16 LED's 8 that show the power level and or temperature level selected for the grilling zone.

Another feature is the ability to set a timer for the grilling process. Setting the temperature for grilling your food and then the time to grill is critical for properly grilled meats, fish and vegetables. Once the user has selected the temperature or power setting of the grilling zone and the temperature has been reached the food to be grilled is placed on the grilling zone. The user then touches the clock face icon 9. The display area 6 switches from displaying the temperature/power to displaying a flashing 1 to indicate one minute. The user must now press the + icon 3 to increase the amount of time desired and then touch the clock face icon 9 again. This starts the cooking timer function. The display area 6 now shows the amount of time left on the clock along with ° F. to indicate that the grilling zone is powered on in the temperature mode. Once the cooking timer has reached zero the power to the grilling zone will be turned off and the clock will flash a zero and give an audible tone, once every five seconds for 30 seconds.

Along with the cooking timer is the ability to set clock timer using the zone that is not being used for grilling. The same steps outlined above are used to set the clock timer from 1-960 minutes. When the clock timer reaches zero it will flash a zero and give a dual audible tone, once every 10 seconds for 3 minutes.

Two safety features built-in to the control are the hot light indicator which indicates the grilling zone is hot to the touch and is represented by 4 wavy lines in the display area. The other is the ability to lock the control system so children can't turn on the grill. The lock feature is activated by placing a finger on the key icon 10 for three seconds. A LED will illuminate indicating the control is locked. To unlock you place a finger on the open padlock icon 11 for three seconds and the control will be unlocked. While in the locked mode the grilling zones, if activated when the control was placed in the lock mode, heat settings or timer functions cannot be altered they can only be turned off.

The ability to select the temperature of the grilling zone is facilitated by the use of a resistance temperature detector or RTD in direct contact with each grilling surface, grate or griddle. This device, in conjunction with the software, reads the temperature of the grilling surface and transfers that data to the display area of the control panel 6. The grilling surface transmits heat efficiently enough so that reading the temperature in one location provides an accurate indication of the entire grilling surface.

For example, the RTD sensor changes resistance as temperature increases. Thus, a relationship between resistance measured and the temperature can be determined. Further, the cooking element or grill grate/griddle is preferably made of a highly conductive material such as cast aluminum or another suitable material. This ensures that heat rapidly transfers and that the RTD sensor accurately conveys temperature of the grilling surface to the controller.

The controller after receiving the selected temperature will turn the grill power on to heat up the cooking element. The software is programmed to maintain temperature within a threshold range of the desired temperature and to efficiently approach the desired temperature. For example, when the user first turns the grill on and selects 400 degrees, the controller may start off at high power in order to rapidly approach the desired temperature. As the temperature approaches 350 degrees (for example), the power may be turned down to slow the rate to temperature increase and again, the power may be decreased again as 375 is passed. The rate of power decrease may be a linear or other function as related to temperature or rate of change of temperature. Therefore, as 400 degrees is reached, the power level will be held at a level sufficient to maintain the 400 degree temperature. An alert may sound or flash to indicate the desired temperature is reached. At this point, the user may open the grill top and place the meat on the grill. The threshold can be based on a degree range or percentage deviation, for example +/−5-10 degrees or +/−1-5% relative to the set temperature. Other threshold ranges are contemplated. The controller may also operate to activate heat by turning power on and off in cycles. For example, power may be turned on for a cold grill and as the bottom of the threshold is reached in terms of sensed temperature of the grill grate, the power would turn off and on for a time period as set by the controller to approach and/or maintain the desired temperature. The power to the grill may also be adjusted by regulation of voltage/current across the heating element to vary the power thereof or the power may be turned on/off to change the temperature of the grilling surface based upon the temperature as determined by the sensor.

Since the cooking element is highly conductive, the drop in temperature due to placing of cold meat on the grill will be rapidly sensed and the grill power will be increased/turned on. In other aspects, when the grill lid is left open, the grill power is also likely to increase or be turned on because the rate of heat transfer from the cooking element to the environment is increased due the grill lid being open.

The RTD includes a housing that is installed below the cooking element. The cooking element is removable to enable cleaning or to enable the user to change the type of cooking element used such as a grill v. griddle selection or combination of these. The heat source as shown is an electrical power source that forms a ribbon pattern within the grill. Corresponding grooves or channels are positioned in the bottom of the cooking element such that the heat source is positioned within the grooves/channels when the grill is assembled. The RTD housing extends from the back of the grill and is generally level with the heat source. A channel is located in the cooking element and when installed, the RTD housing contacts the underside of the cooking element in the channel. Depending on the number of zones provided, there will be a RTD for each zone or possibly multiple RTDs for a single zone. For example, the ribbon arrangement of the heat source includes two straight and parallel elements extending from the grill which lay across the grill, curve around and have two parallel sections extending back towards the back of the grill which meet at a curved portion spaced away from the back of the grill. The RTD housing is positioned in the space between the back of the grill and the curved portion where the two parallel sections meet. In the embodiment shown, the RTD housing extends about 1-1.5" from the back of the grill 56 and a 0.5-1" gap exists between the heat source and the RTD housing. In addition, the channel that receives the RTD housing has an end wall 36 that separates the RTD housing from the heat source when the cooking element is installed. This end wall 36 may be the same wall that defines the channel 32 for the heat source. As can be seen, the holes in the grill are located between our outside of the channel 32/34 so that grease or other matter falling through the holes into the drip pan 52 do not directly contact the temperature sensor or the heating element. Particularly, if the grease/matter falling through the holes were to contact the heating element, smoking would be expected, thus the configuration shown reduces such a possibility. It is understood that different types of sensors other than an RTD can be used.

Figure 2:
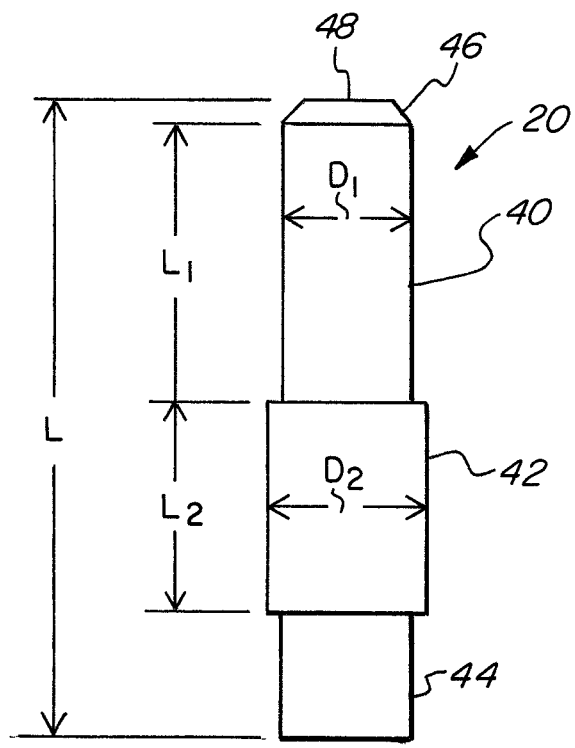
FIG. 2 is a top view of a housing for the temperature sensor of FIG. 1
Figure 3:
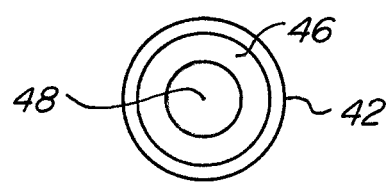
FIG. 3 is a rear view of a housing for the temperature sensor of FIG. 1

The diagram of FIG. 1 shows the grill 100 with heating element 30 below the cooking element 22. Sensor housing 20 is in contact with the cooking element 22 and separated from the heating element or heat source. The grill is contained in a housing 24 which has lid that can open and shut. Controller 26 includes the selectors and dials previously described. As can be seen, the grill is electrically powered, but it is contemplated that other heat sources may be used. FIGS. 2 and 3 show views of the housing for the sensor housing 20. The dimensions are exemplary and not limiting. Referring to FIGS. 4-7, the bottom of the cooking element 22 includes channels therein. A channel 32 receives the electrical heat source/coil 30 therein and this allows the cooking element 22 to be removed from the grill for cleaning. Housing 20 contains the sensor and has a corresponding channel 34. Channels 32 and 34 are separated by wall 36 so that the heat source 30 is not directly in contact with the housing 20 in a way that might skew surface temperature readings. In one embodiment, the channel is U shaped such that the heat source 30 and the housing 20 can be inserted into their respective channel 32/34 when the cooking element 22 is placed into the grill.

The RTD and its housing are shown in FIGS. 2-3. As can be seen there the cylindrical part 40 has a diameter D1 and this fits into the corresponding channel. Cylindrical part 42 has a larger diameter D2 and part 44 may be threaded to allow for the RTD and its housing to be securely affixed to the grill body with a nut and associated sensor wiring may exit the housing at the threaded end and connect to the controller. The length L1 of the cylindrical part 40 that sits in the channel accounts for the majority of the overall length L. The end 48 includes a tapered section 46.

Figure 4:
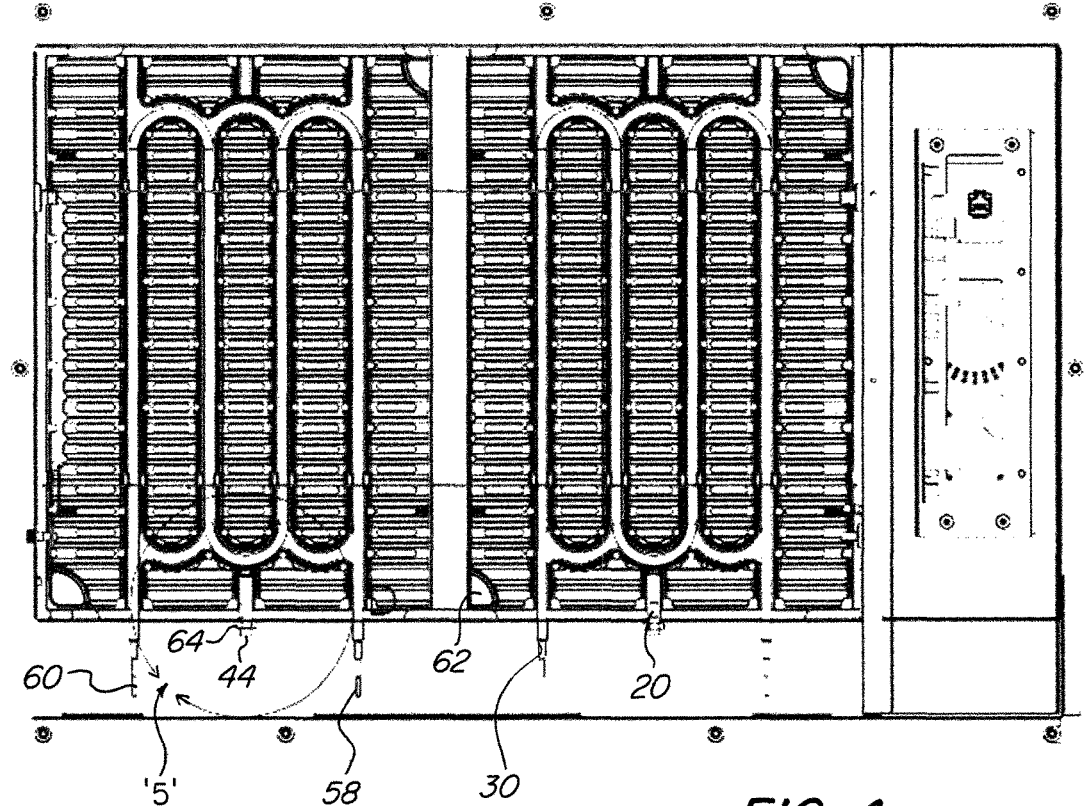
FIG. 4 is a view from underneath the grilling surface shown on the grill of FIG. 1
Figure 5:
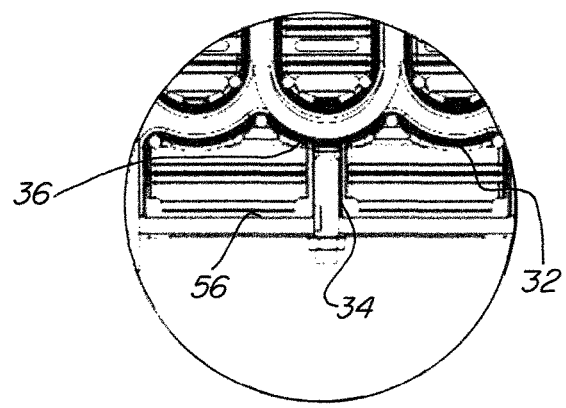
FIG. 5 is a detail view of FIG. 4.

As can be seen in FIG. 4, two heating elements or heat sources 30 are shown. Each of these is connected to a separate one of the controllers shown in FIG. 1, which enables the grill to be controlled in two zones. Electrical contacts 60/58 enable the heat source 30 to connect electrically. It is understood that more or fewer zones could be provided as would be apparent to those skilled in the art.

Figure 6:
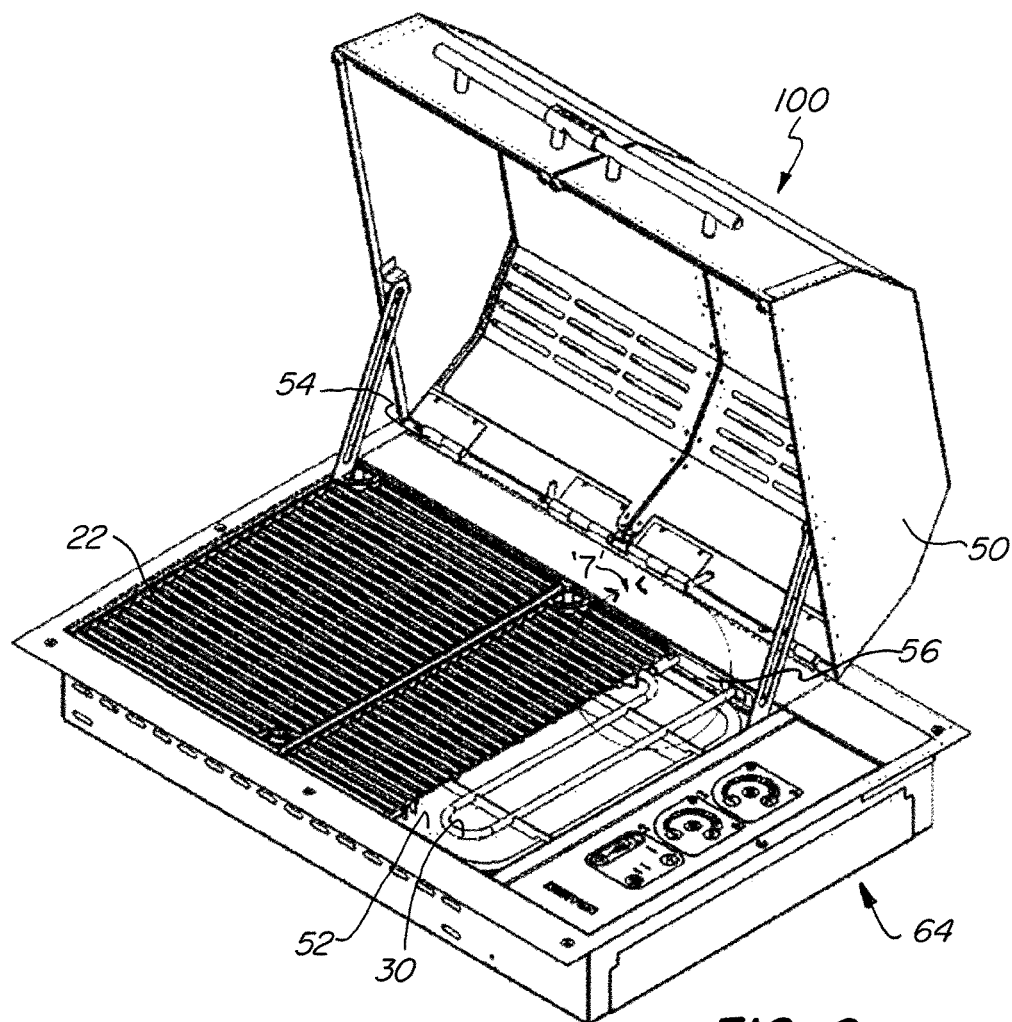
FIG. 6 is a perspective partial cutaway view of the grill of FIG. 1
Figure 7:
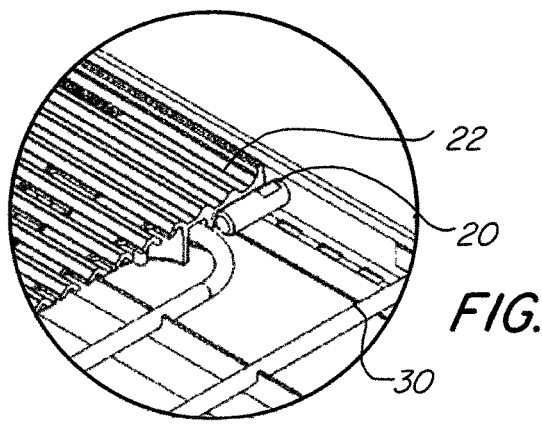
FIG. 7 is a detail view of FIG. 6.

Referring to FIG. 6, the grill 100 is shown with a lid 50 the cooking element 22 and the drip pan 52 below the cooking element 22. The lid 50 is connected to the grill base 64 via hinges 54. As described previously, the heat source 30 and sensor 20 fit into the rear channel of the cooking element 22. The cooking element 22 can be removed for cleaning. To make removal easier, holes 62 are provided at an edge of the cooking element 22.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A grill comprising:
   a selector;
   a controller coupled to said selector such that an input received from said selector is indicative of a selected temperature;
   a heat source coupled to said controller wherein said controller is configured to adjust heat output from said heat source;
   a cooking element having a cooking surface with holes therein to allow matter to pass there through during cooking;
   a temperature sensor securely affixed to the grill and in contact with the cooking element and wherein said cooking element is removable with respect to the temperature sensor when said temperature sensor is securely affixed to the grill;
   said controller receiving a temperature reading from said temperature sensor and adjusting the heat output of said heat source to maintain said cooking element at approximately the selected temperature;
   a perimeter of a grill area of the grill defined by an edge such that said cooking element is adjacent to said edge and, said temperature sensor extends adjacent said edge in a direction inwards with respect to the perimeter such that said cooking element is in contact with said temperature sensor in a location within said perimeter.

2. The grill of claim 1 further comprising:
   a first channel positioned on a rear face of the cooking element, opposite the cooking surface, said first channel including a first set of at least two first sidewalls such that said heat source is configured to fit within and is removable from said first channel;
   a second channel positioned on the rear face of the cooking element, opposite the cooking surface and having a downward facing opening, said second channel including a second set of at least two sidewalls such that said temperature sensor is configured to fit within and is removable from said second channel.

3. The grill of claim 1 further comprising:
   a channel positioned on a rear face of the cooking element, opposite the cooking surface, said channel including at least two sidewalls such that said temperature sensor is configured to fit between said at least two sidewalls and is removable therefrom, said channel further including a downward facing opening.

4. The grill of claim 2 wherein the second set of at least two sidewalls defining said second channel and extend from the one of said at least two first sidewalls towards an edge of the cooking element, said second set of at least two sidewalls contact and extend directly from the one of said first set of at least two sidewalls.

5. The grill of claim 3 wherein said channel includes two substantially straight sections joined by a curved section, said channel located adjacent to the curved section.

6. The grill of claim 1 wherein said temperature sensor is a resistance thermal detector (RTD) embedded in a housing, the housing directly in contact with said cooking element.

7. The grill of claim 1 wherein the heat source is an electrically powered heating element.

8. The grill of claim 1 wherein said selector configured to receive a second input indicative of a desired cooking time wherein when said desired cooking time expires, said heat source is turned off.

9. The grill of claim 1 wherein said cooking element includes a channel sized to receive said temperature sensor therein.

10. The grill of claim 1 wherein said temperature sensor includes a housing which contacts a channel of the cooking element sized to receive said temperature sensor therein.

11. The grill of claim 1 wherein said cooking element is a grill grate and a drip pan is located below said cooking element.

12. The grill of claim 1 wherein said cooking element is removable from both said temperature sensor and said heat source.

13. The grill of claim 1 wherein said selector further includes a display which is configured to display said selected temperature.

14. The grill of claim 1 wherein said controller is configured adjust a heat output when a reduction in temperature of the cooking element is detected.

15. The grill of claim 1 wherein a surface of the cooking element facing opposite to and being directly below the cooking surface is in contact with the temperature sensor.

16. A grill comprising:
    a selector;
    a cooking element having a cooking surface with holes therein to allow matter to pass there through during cooking;
    a controller coupled to said selector such that an input received from said selector is indicative of a selected temperature for the cooking surface;
    an electric heat source coupled to said controller wherein said controller is configured to adjust heat output from said heat source to maintain the cooking surface at approximately the selected temperature;
    a temperature sensor contained in a housing, the housing in direct contact with the cooking element opposite to and below the cooking surface and wherein said cooking element is removable with respect to the temperature sensor and said electric heat source;
    said controller receiving a temperature reading from said temperature sensor and adjusting the heat output of said heat source to maintain said cooking element at approximately the selected temperature;
    the electric heat source and the temperature sensor positioned below the cooking element at a location without holes such that the matter passing through the holes is inhibited from contact with the electric heat source and the temperature sensor.

17. The grill of claim 16 further comprising:
    a first channel positioned on a rear face of the cooking element, opposite the cooking surface, said first channel including a first set of at least two first sidewalls such that said electric heat source is configured to fit within and is removable from said first channel;
    a second channel positioned on the rear face of the cooking element, opposite the cooking surface and having a downward facing opening, said second channel including a second set of at least two sidewalls such that said housing containing said temperature sensor is configured to fit within and is removable from said second channel.

18. The grill of claim 16 further comprising:
    a channel positioned on a rear face of the cooking element, opposite the cooking surface, said channel including at least two sidewalls such that said housing containing said temperature sensor is configured to fit between said at least two sidewalls and is removable therefrom, said channel further including a downward facing opening.

19. The grill of claim 17 wherein the second set of at least two sidewalls defining said second channel and extend from the one of said at least two first sidewalls towards an edge of the cooking element, said second set of at least two sidewalls contact and extend directly from the one of said first set of at least two first sidewalls.

20. The grill of claim 16 wherein said temperature sensor is a resistance thermal detector (RTD).

21. The grill of claim 16 wherein said selector configured to receive a second input indicative of a desired cooking time wherein when said desired cooking time expires, said electric heat source is turned off.

22. The grill of claim 16 wherein said cooking element includes a channel sized to receive said temperature sensor therein.

23. The grill of claim 16 wherein said cooking element is a grill grate and a drip pan is located below said cooking element.

24. The grill of claim 16 wherein said cooking element is removable from both said temperature sensor and said heat source.

25. The grill of claim 16 wherein said selector further includes a display which is configured to display said selected temperature.

26. The grill of claim 16 wherein said controller is configured adjust a heat output when a reduction in temperature of the cooking element is detected.

* * * * *